(12) United States Patent
Henriet et al.

(10) Patent No.: US 12,059,934 B2
(45) Date of Patent: Aug. 13, 2024

(54) TIRE PRESSURE DETECTOR WITH MULTIPLE FREQUENCIES

(71) Applicant: Sensata Technologies, Inc., Attleboro, MA (US)

(72) Inventors: Nicolas Henriet, Arcon (FR); Emmanuel Marguet, Arcon (FR); Ian G. Barrett, Cirencester (GB); Felipe Blanco Pozatto, Munich (DE)

(73) Assignee: Sensata Technologies, Inc., Attleboro, MA (US)

( * ) Notice: Subject to any disclaimer, the term of this patent is extended or adjusted under 35 U.S.C. 154(b) by 170 days.

(21) Appl. No.: 17/737,104

(22) Filed: May 5, 2022

(65) Prior Publication Data
US 2023/0356550 A1 Nov. 9, 2023

(51) Int. Cl.
*B60C 23/04* (2006.01)

(52) U.S. Cl.
CPC ...... *B60C 23/0462* (2013.01); *B60C 23/0452* (2013.01)

(58) Field of Classification Search
CPC ................ B60C 23/0462; B60C 23/0452
See application file for complete search history.

(56) References Cited

U.S. PATENT DOCUMENTS

| | | | |
|---|---|---|---|
| 9,333,815 B2 | 5/2016 | Henriet et al. | |
| 10,399,393 B1* | 9/2019 | Trotta | B60C 23/0452 |
| 2005/0132791 A1 | 6/2005 | Hayashi | |
| 2006/0049924 A1 | 3/2006 | Iijima | |
| 2010/0141416 A1 | 6/2010 | Kukshya et al. | |
| 2014/0306815 A1 | 10/2014 | Henriet et al. | |
| 2018/0229559 A1* | 8/2018 | Yu | B60C 23/0452 |
| 2021/0067195 A1 | 3/2021 | Yu et al. | |

OTHER PUBLICATIONS

The PCT Search Report and Written Opinion mailed Jul. 3, 2023 for PCT application No. PCT/US2023/016530, 18 pgs.

* cited by examiner

*Primary Examiner* — Daryl C Pope
(74) *Attorney, Agent, or Firm* — Lee & Hayes, P.C.

(57) ABSTRACT

A tire monitor includes a sensor generating tire data and a plurality of control modules having phase locked loop circuits. The control modules generate output signals carrying the tire data. A first of the control modules is configured to generate first output signals having a first frequency and according to a first protocol. A second of the control modules is configured to generate second output signals having a second frequency and according to a second protocol. In examples, the output signal can be transmitted in parallel to different computing systems.

20 Claims, 3 Drawing Sheets

TIRE PRESSURE DETECTOR WITH MULTIPLE FREQUENCIES

FIELD OF THE TECHNOLOGY

The subject disclosure relates to tire pressure monitoring systems, and more particularly to tire pressure detectors having multiple frequencies for receiving and transmitting data.

BACKGROUND OF TECHNOLOGY

Proper tire pressure is important to proper vehicle functioning. For instance, tires having low tire pressure may be unsafe and/or may reduce operating efficiency of the vehicle, e.g., by reducing gas mileage. Conventionally, a tire pressure detector or tire pressure monitor is attached to a tire, or to a wheel on which the tire is mounted. The tire pressure monitor detects a pressure of the associated tire. The detected pressure may be received at a tire pressure monitoring system, which in turn can transmit information about the pressure to a vehicle operator or passenger. In some conventional systems, the tire pressure monitoring system receives data from the tire pressure monitor(s) wirelessly and/or transmits data wirelessly, e.g., for display via a user display in the vehicle. For instance, the tire pressure monitoring system may receive and/or transmit data via a radio frequency transmission.

Conventionally, different automobile manufacturers have implemented different tire pressure monitoring specifications. For instance, tire pressure monitors may be configured to detect different types of information, e.g., one or more of pressure information, motion information, temperature information, speed information, acceleration information, and/or other information. Tire pressure monitoring systems also may be configured to function at different frequencies. For instance, some conventional tire pressure monitors can transmit data to/from a tire pressure monitoring system at frequencies including 315 MHz or 433.92 MHz. The myriad designs of tire pressure monitors lead to complications in the aftermarket. For instance, a retailer is required to stock multiple part numbers, e.g., one replacement part corresponding to each monitor that may be replaced.

BRIEF DESCRIPTION OF THE DRAWINGS

So that those having ordinary skill in the art to which the disclosed systems and techniques pertain will more readily understand how to make and use the same, reference may be had to the following drawings.

DETAILED DESCRIPTION

The subject technology overcomes prior art problems associated with tire pressure monitors. For example, systems and techniques described herein provide improved tire monitors usable with myriad different tire monitoring systems. For example, the technology described herein provides a single tire pressure monitor that can be configured to transmit information to multiple receivers. In some instances, information can be transmitted to multiple receivers in parallel. The advantages, and other features of the systems and methods disclosed herein, will become more readily apparent to those having ordinary skill in the art from the following detailed description of certain preferred embodiments taken in conjunction with the drawings which set forth representative examples of the present disclosure.

In some aspects of this disclosure, a tire monitor is coupled to a tire of an automobile. The tire monitor includes a pressure sensor, and, in at least some instances a motion sensor, a temperature sensor, and/or one or more other sensors. The sensor(s) generate sensor data that can be transmitted to one or more computing systems.

In aspects of this disclosure, the tire monitor is configurable to transmit the sensor data via a first frequency and/or according to a first protocol to a first computing device. The first computing device may be a tire pressure monitoring system onboard the vehicle. The tire monitor is also configurable to transmit the sensor data via a second frequency and/or according to a second protocol to a second computing device. The second computing device may be a personal device, such as a mobile device.

According to additional aspects of this disclosure, a first control module is configured to generate first output signals to transmit the sensor data to the first computing device. The first control module may include a first phase locked loop (PLL) circuit that generates the first output signals according to one of a plurality of frequencies. A second control module is configured to generate second output signals to transmit the sensor data to the second computing device. The second control module may include a second phase locked loop (PLL) circuit that generates the second output signals according to one of a plurality of frequencies.

As a result of the improved tire monitors disclosed herein, a vehicle service center or similar retailer can stock fewer specialized replacement parts. For instance, because the tire monitors are configurable to transmit data at different frequencies and/or according to different protocols, the need for specific replacement parts with fixed frequencies and/or transmission protocols is obviated. These and other features and benefits of this disclosure will be discussed with reference to the Figures.

Figure 1:
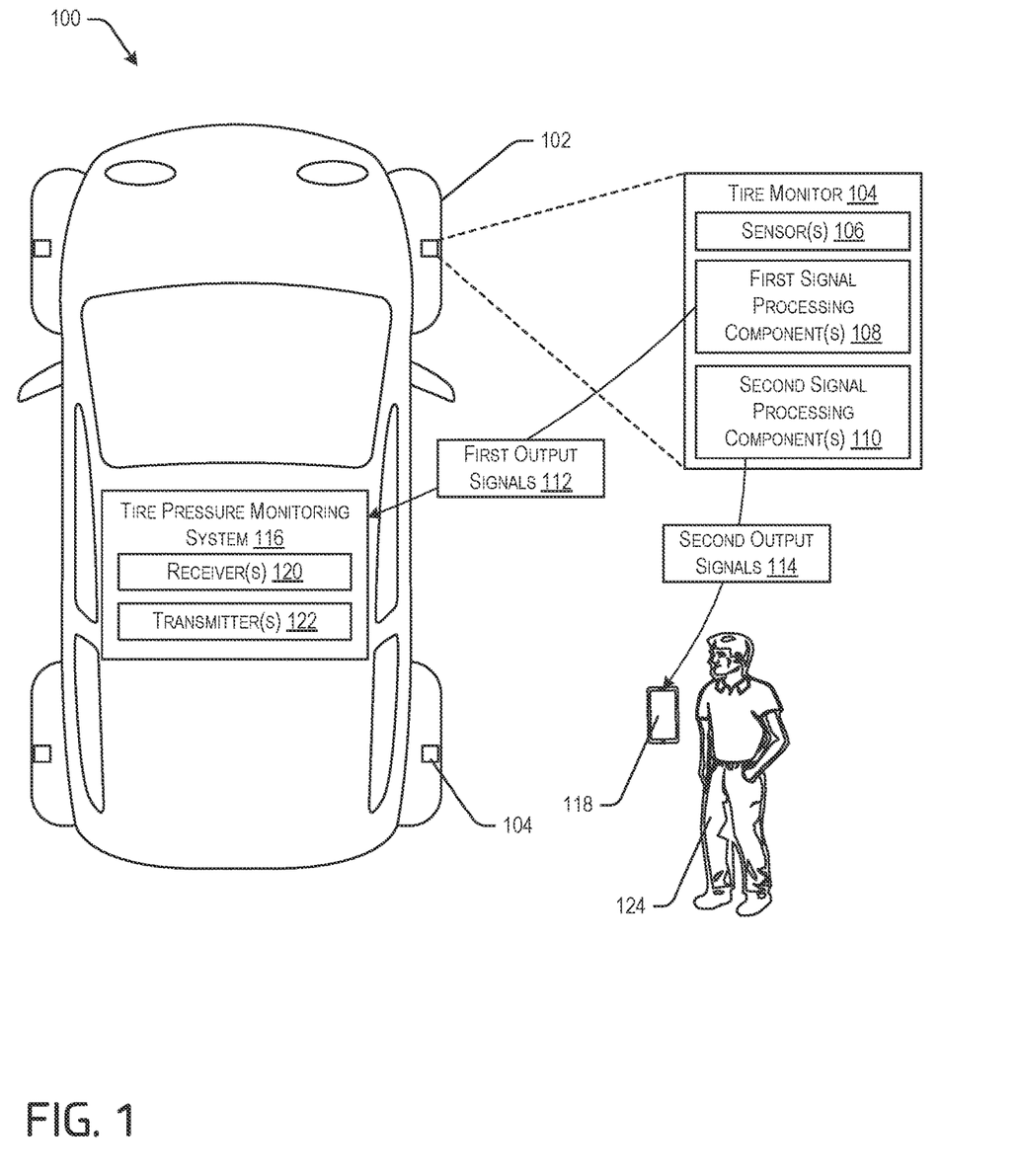
FIG. 1 is a schematic representation of a vehicle including tire pressure monitors and a tire pressure monitoring control module, in accordance with aspects of this disclosure.

FIG. 1 illustrates a vehicle 100 including a number of tires 102. Each of the tires 102 includes a tire monitor 104. Specifically, one of the tire monitors 104 is coupled to each of the tires 102. According to aspects of this disclosure, each of the tire monitors 104 can include, among other features, one or more sensors 106, first signal processing component(s) 108, and second signal processing component(s) 110. Although not illustrated in FIG. 1, each of the tire monitors 104 may also include one or more power sources, e.g., batteries, and/or other conventionally-known components.

The sensor(s) 106 are configured to generate signals associated with one or more measured attributes of the tires 102. For example, the sensor(s) 106 can include a pressure sensor configured to generate pressure data associated with the associated tires. In another example, the sensor(s) 106 can include a temperature sensor configured to generate temperature data associated with the tire. The sensor(s) 106 can also, or alternatively, include motion sensors. For example, motion sensor(s) can include an accelerometer, a gyroscope, an inertial measurement unit, a resolver, a rotary sensor, a position sensor, or the like. The sensor(s) 106 may generate updated data at a predetermined frequency, e.g., according to a sampling rate. The sensor(s) 106 may be configurable, e.g., the sampling rate may be adjustable. For example, the sensor(s) 106 may generate data at a first sampling rate when the vehicle is in motion and at a second sampling rate when the vehicle is stationary.

Both the first signal processing component(s) 108 and the second signal processing component(s) 110 may be configured to process signals generated by the sensor(s) 106, e.g., in parallel. In some examples, the first signal processing component(s) 108 and the second signal processing component(s) 110 may have substantially the same functionality. For example, the first signal processing component(s) 108 can include functionality to modulate a signal corresponding to data from the sensor(s) 106 onto first output signals 112. The first output signals 112 may be associated with a first protocol, e.g., including a first radio frequency output. Similarly, the second signal processing component(s) 110 can include functionality to modulate a signal corresponding to data from the sensor(s) 106 onto second output signals 114. The second output signals 114 may be associated with a second protocol, e.g., having a second radio frequency output. As detailed further below with reference to FIG. 2, the first signal processing component(s) 108 can include a first control module, a first multi-frequency matching circuit, and a first multi-frequency antenna. The second signal processing component(s) 110 can include a second control module, a second multi-frequency matching circuit, and a second multi-frequency antenna. Although the example of FIG. 1 shows only the first signal processing component(s) 108 and the second processing component(s) 110, additional instances of the signal processing component(s) can also be included.

The first signal processing component(s) 108, as noted above, may be configured to generate the first output signals 112, and the second signal processing component(s) 110 may be configured to generate the second output signal 114. The first output signals 112 and the second output signals 114 are radio frequency (RF) signals carrying information associated with data generated by the sensor(s) 106. The first output signals 112 carry information generated by the sensor(s) 106 and may conform to a first protocol. The second output signals 114 can carry the same information generated by the sensor(s) 106 and may conform to a second protocol. Without limitation, the first protocol and the second protocol can include one or more of a frequency or bandwidth, e.g., a transmission frequency, a transmission channel, a data rate, a transmission power, or other characteristics of a wireless transmission. In at least some examples, the first protocol and/or the second protocol may correspond to conventional communication protocols, such as Bluetooth®, near-field communication standards, or the like.

In the example of FIG. 1, the first output signals 112 are configured for transmission to, and reception by, a tire pressure monitoring system 116. The second output signals 114 are configured for transmission to, and reception by, a remote computing device 118, which may be a personal user device.

As illustrated in FIG. 1, the tire pressure monitoring system 116 is a computing system onboard the vehicle 100. Generally, the tire pressure monitoring system 116 includes functionality to receive signals, e.g., the first output signals 112, from the tire monitors 104. In examples, the tire pressure monitoring system 116 includes logic to determine whether any of the associated tires 102 has a tire pressure that is outside of a certain predefined operating limit. For instance, the tire pressure monitoring system 116 can include a pressure for each of the tires 102 based on the first output signals 112, and identify that the pressure of the tire is lower than a first threshold pressure (e.g., the tire is underinflated) or higher than a second threshold pressure (e.g., the tire is overinflated). The tire pressure monitoring system 116 can also include logic to transmit tire information, e.g., tire pressure, a determined alarm state, and/or the like, for presentation on an operator interface (not shown in FIG. 1) in the vehicle 100. Without limitation, the tire pressure monitoring system 116 can transmit data for presentation via a wired or wireless communication connection.

In the example of FIG. 1, the tire pressure monitoring system 116 is illustrated as including a receiver 120 and a transmitter 122. The receiver 120 may be configured to receive signals, e.g., the first output signals 112, from the tire monitors 104. The tire pressure monitoring system 116 is generally configured, e.g., at manufacture, for the receiver 120 to cooperate with original tire monitors installed at the tires 102 at manufacture/assembly. Specifically, and as noted above, the protocol used to transmit signals from the original tire monitors and received at the tire pressure monitoring system 116 may be specific to the automobile. For instance, an original tire monitor may be configured to transmit, and the receiver 120 may be configured to receive, signals transmitted according to a specific frequency. For example, and without limitation, conventional frequencies can include 315 MHz and 433.92 MHz.

The transmitter 122 may be configured to transmit data. For instance, the transmitter 122 can transmit data to the tire monitor 104, e.g., to request information, to instruct a reconfiguration such as a modified sampling rate, or the like. The transmitter 122 can also be configured to transmit data to other electronic devices, e.g., an electronic device associated with an owner of the vehicle 100, to a display of the vehicle 100, or the like. The transmitter 122 may be configured to send data according to any of a number of conventional protocols.

As noted above, FIG. 1 also shows that the tire monitor 104 generates the second output signals 114, e.g., via the second signal processing component(s) 110. In the example, the second output signals 114 are transmitted to the remote computing device 118. The remote computing device 118 is illustrated as being a personal device, e.g., a mobile phone, a tablet, or the like, associated with a user 124. For example, the user 124 may be an owner of the vehicle 100, a lessee, a technician, a fleet manager, or any individual associated with the vehicle 100. As will be appreciated, the remote computing device 118 and the user 124 are shown for example only. In implementations, the remote computing device 118 can be any computing device capable of receiving the second output signals 114.

The tire monitor 104 of the present disclosure includes functionality for communicating tire-specific information, e.g., pressure, motion data, acceleration data, position data, and/or the like, with both the tire pressure monitoring system 116 and the remote computing device 118. As will be appreciated from the foregoing, the tire pressure monitoring system 116 is configured to receive signals according to a first protocol, e.g., established at vehicle manufacture, and the remote computing device is configured to receive signals according to a second protocol, e.g., based at least in part on capabilities, settings, specifications, and/or the like of the remote computing device 118. Moreover, and as detailed further herein, the tire monitor 104 is configurable to generate the first output signals 112 and the second output signals 114 for transmission to the tire pressure monitoring system 116 and/or the remote computing device 118, e.g., based on attributes of the tire pressure monitoring system 116 and/or the remote computing device 118.

Figure 2:
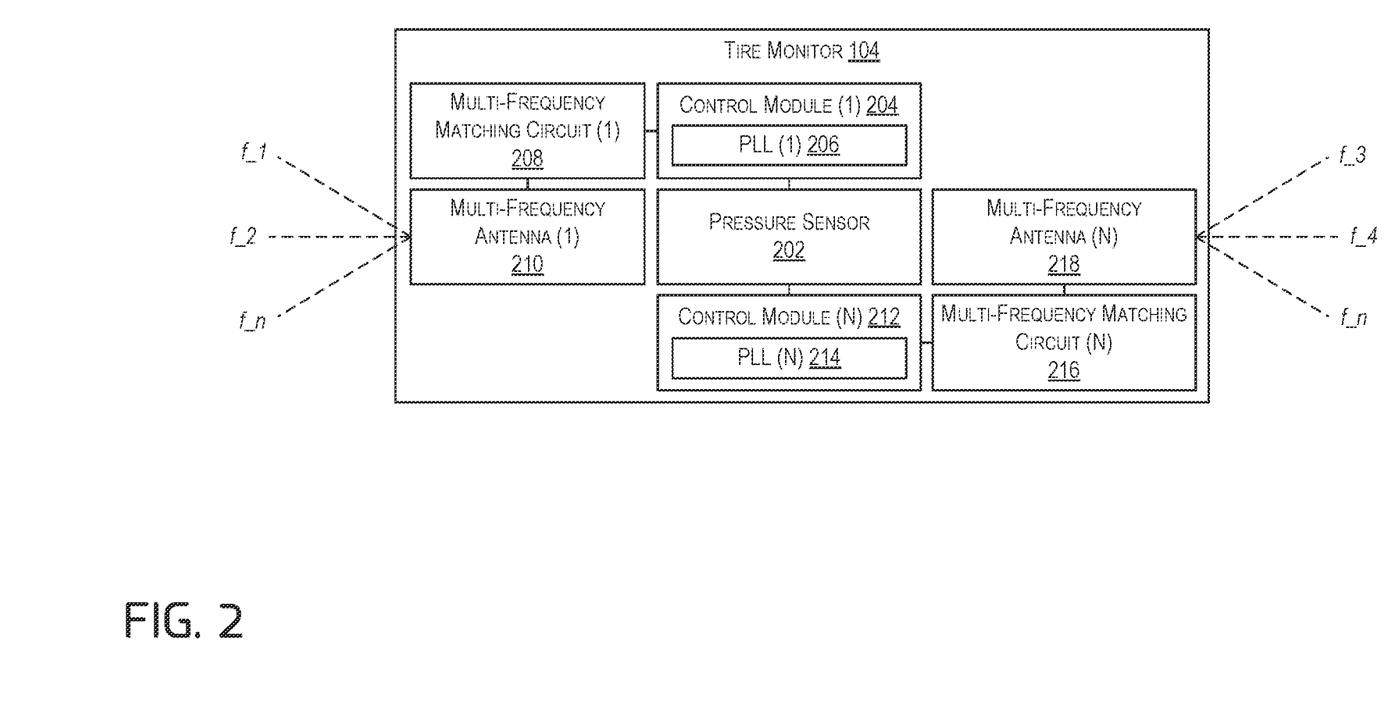
FIG. 2 is a flowchart illustrating an example process for monitoring tire pressure, in accordance with aspects of this disclosure.

FIG. 2 is a block diagram showing an example of the tire monitor 104 in more detail. FIG. 2 will be used to describe aspects and techniques for configuring the tire monitor 104 to transmit tire information to one or more receivers, e.g., according to different protocols.

In the example of FIG. 2, the tire monitor 104 is illustrated as including a plurality of modules or other logically-connected computing blocks. For instance, various of the illustrated blocks and/or other aspects of the tire monitor 104 may be implemented in an intelligent hardware device, e.g., a central processing unit (CPU), a microcontroller, an application specific integrated circuit (ASIC), or may be implemented as part of a reconfigurable device. Aspects of the tire monitor 104 can include random access memory (RAM) and read-only memory (ROM) which may include instructions that are configured to, when executed (or when compiled and executed), cause aspects of the tire monitor 104 to perform various functions described herein (including but not limited to the operations of the process illustrated in FIG. 3 and discussed further below. Various components of the tire monitor 104 may be implemented using one or more separate CPUs or ASICs, for example, and the components may, individually or collectively, be implemented with one or more ASICs adapted to perform some or all of the applicable functions in hardware. Each of the noted components may be a means for performing one or more functions related to operation of the system.

More specifically, the tire monitor shown in FIG. 2 includes a pressure sensor 202. The pressure sensor 202 is configured to sense a pressure within a tire to which the tire monitor is coupled, e.g., one of the tires 102. For example, the pressure sensor 202 can be one of the sensor(s) 106 discussed above. As will be appreciated, the pressure sensor 202 can generate data associated with a pressure of the tire, and the generated data can be used to determine whether the tire is properly inflated. Improperly inflated tires can be hazardous.

As also shown in FIG. 2, the pressure sensor 202 is communicatively coupled to a first control module 204. The first control module 204 includes a phase-locked loop (PLL) 206, which may be an N-fractional PLL. The first control module 204 is communicatively coupled to a first multi-frequency matching circuit 208, and the first multi-frequency matching circuit 208 is communicatively coupled to a first multi-frequency antenna 210. In examples, the first control module 204 (including the first PLL 206), the first multi-frequency matching circuit 208, and the first multi-frequency antenna 210 can be an example of the first signal processing component(s) 108, e.g., configured to generate and output the first output signals 112.

In more detail, the first control module 204 may implement the PLL 206 to receive an input reference frequency as an intermediate frequency (IF) and modulate information onto the IF signal according to a particular protocol that is programmed into the first control module 204. In some examples, the PLL 206 can include a frequency select input used to change the final output frequency of the first control module 204. For example, when the first output signals 112 are intended for receipt by the tire pressure monitoring system 116, the frequency select input may be used to select a final output frequency of either 315 MHz or 433.92 MHz. Of course, other frequencies can also be used. The frequency select input may be programmed into the tire monitor 104 during initial configuration of the tire monitor 104. In some embodiments, the first control module 204 can be implemented as an ASIC configurable to operate at the selected frequency through a programming operation, as will be described in more detail below, that configures both a frequency and a protocol associated with the first output signals 112.

The PLL 206 can include a programmable logic function that receives the frequency select input and is configured to open or close one or more switch. For instance, opening/closing the switch(es) can operatively connect one or more matching circuits of the first multi-frequency matching circuit 208 with components of an RF transmit chain that may include an N-fractional PLL, a crystal oscillator, and/or a power amplifier. The frequency select input may also be coupled with the N-fractional PLL to select an appropriate multiplier that is used in the N-fractional PLL, e.g., to provide the desired frequency output. For example a crystal oscillator of 20 MHz would have a multiplier of 15.75 times to produce an output frequency of 315 MHz. A multiplier of 21.696 times would produce an output frequency of 433.92 MHz.

The PLL 206 may output a high frequency RF signal at a selectable frequency signal through the first multi-frequency matching circuit 208. In examples, the first multi-frequency matching circuit 208 may include a plurality of matching circuits that use impedance matching. For instance, a first matching circuit may include a capacitor coupled with multiple inductors and capacitors of an RF impedance matching circuit. A second matching circuit may omit the capacitor. Switching one or more components to be coupled to the matching circuit may obtain the desired impedance matching based on a particular frequency of interest. Thus, switch elements may be provided in such circuits to switch in and out different matching circuit components to obtain a desired matching circuit impedance. Of course, it will be readily understood by one of skill in the art that one of a number of different selected frequencies may be obtained by providing the appropriate frequency select inputs to a PLL module to produce a desired PLL output frequency and switch appropriate matching components to be coupled with a matching circuit to provide desired impedance matching characteristics for the matching circuit. Accordingly, the principles described herein are applicable to devices that may be configured to operate according to one of two or more different frequencies.

Accordingly, the first control module 204, using the first PLL 206, may output a high frequency RF at a selectable frequency signal through the first multi-frequency matching circuit 208, e.g., as the first output signals 112. The first output signals 112 are then transmitted, as RF signals at the selected frequency signal, via the first multi-frequency antenna 210 to the tire pressure monitoring system 116. As shown in FIG. 2, the first multi-frequency antenna 210 can be configured to transmit signals, e.g., as the first output signals 112, at a plurality of frequencies (f_1, f_2, f_n).

FIG. 2 also shows that the pressure sensor 202 is communicatively coupled to a second control module 212. The second control module 212 includes a second phase-locked loop (PLL) 214, which may be an N-fractional PLL. The second control module 212 is communicatively coupled to a second multi-frequency matching circuit 216, and the second multi-frequency matching circuit 216 is communicatively coupled to a second multi-frequency antenna 218. In examples, the second control module 212 (including the second PLL 214), the second multi-frequency matching circuit 216, and/or the second multi-frequency antenna 218 can be an example of the second signal processing component(s) 110, e.g., configured to generate and output the second output signals 114.

The second control module 212 and associated components can perform substantially the same functions just described with reference to the first control module 204. However, the second control module 212, the second PLL 214, the second multi-frequency matching circuit 216, and/or the multi-frequency antenna 218, may be configured to generate and transmit the second output signals 114 at frequencies and/or protocols different from those achievable at the first output signals 112. For instance, the second output signals 114 may be configured for transmission according to Bluetooth® protocols, or the like. Moreover, in some examples, the second output signals 114 can include more, less, or different information than the first output signals 112.

Although FIG. 2 shows only the first control module 204 and the second control module 212, in other examples of this disclosure additional control modules, e.g., up to "n" control modules, may be provided, each with associated matching circuitry and antennas.

Although not shown in FIG. 2, the tire monitor 104 can include a number of additional components to facilitate the functionality described herein, as will be appreciated by those having ordinary skill in the art. For instance, the tire monitor 104 may include one or more external oscillators, which may be used to provide a reference frequency that is used in one or more RF components within the tire monitor 104. As is conventional in the art, the tire monitor 104 can also include a motion sensor, an external low frequency (LF) circuit, and/or a power source. For example, the motion sensor may be used initiate transmission from the tire monitor 104, e.g., based on detected events from an accelerometer or other type of shock detection apparatus. The LF circuit may be used for receiving external inputs, and the power source, which may be a battery, may be used to provide power to the various components of the tire monitor 104.

Also in examples, and although not illustrated in FIG. 2, the control modules 204, 212 can include a microcontroller coupled with an LF interface, an RC oscillator 260, a temperature sensor 265. The control modules 204, 212 can also include an analog-to-digital converter (ADC) and/or a memory. In examples, the LF interface, which may be coupled to an LF circuit, may receive information from an external device, for example a programming interface and determine the required frequency for the PLL 206, 214, e.g., to facilitate the switching discussed above. The RC oscillator may be used to provide a signal to the microcontroller to provide a clock signal for the microcontroller. The temperature sensor may sense the operating temperature of the control module, and the temperature may be used to compensate sensor readings and operating frequencies. An example temperature sensor may include a silicon-based temperature sensor that provides a signal that is used to adjust frequencies that may drift based on temperature of RF components or adjust readings provided from pressure sensor 202 that are calibrated based on temperature. As noted above, the PLLs 206, 214 may include RF sections that receive an input reference frequency as an intermediate frequency (IF) and modulate information onto the IF signal according to a particular protocol that is programmed into the device. The PLL/switch module 270 may output a high frequency RF at a selectable frequency signal through the matching circuits 208, 216, and antennas 210, 218, as described herein.

Figure 3:
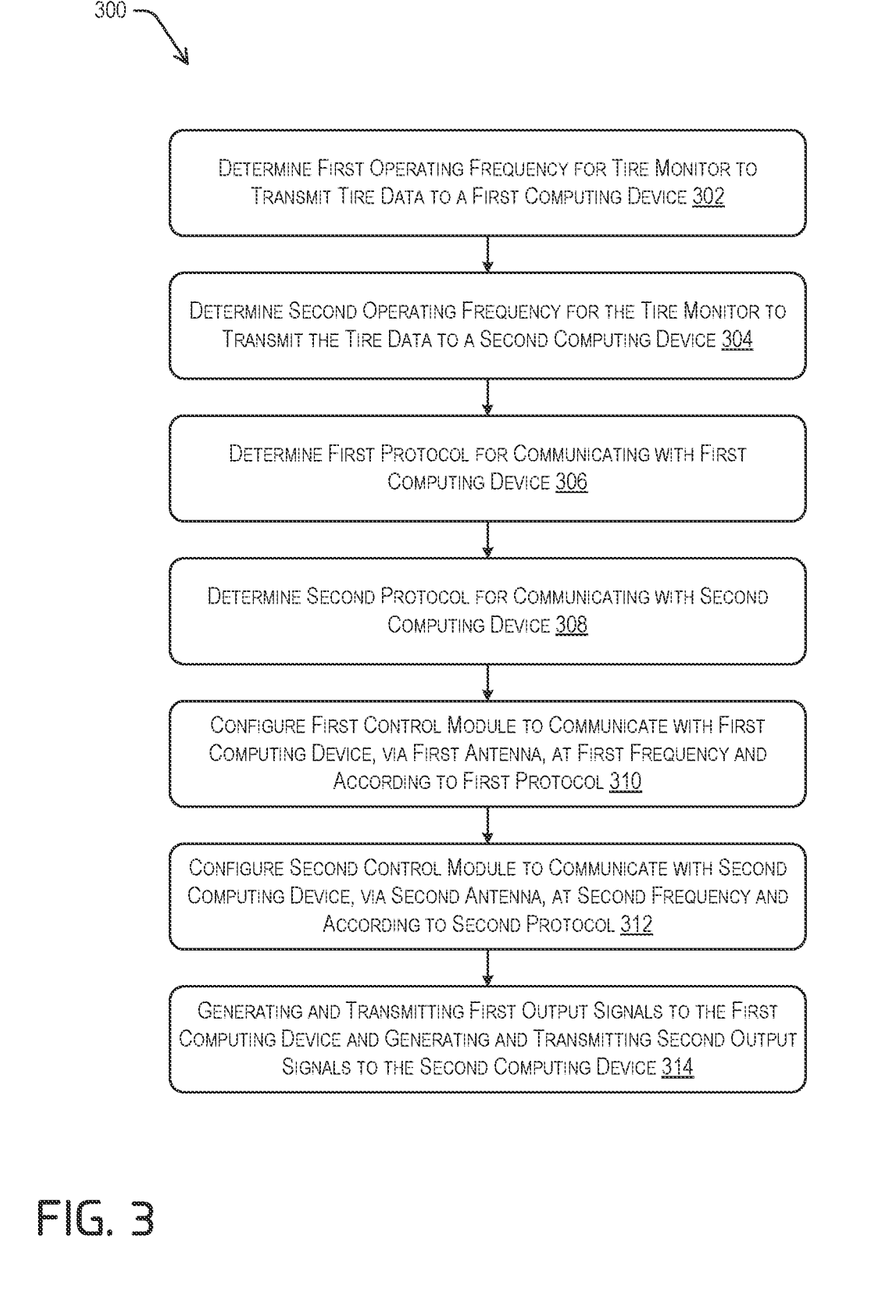
FIG. 3 is a flowchart illustrating an example process for monitoring tire pressure in stationary vehicles, in accordance with aspects of this disclosure.

FIG. 3 illustrates an example process 300 in accordance with aspects of the disclosure. The process is illustrated as logical flow graphs, with each operation representing a sequence of operations that can be implemented in software, hardware, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The various illustrative operations, components, and systems described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

In more detail, FIG. 3 is a flowchart showing the example process 300, which is a process for providing and configuring a tire monitor, e.g., a replacement tire monitor, to transmit tire data to multiple computing devices at multiple operating frequencies and using multiple protocols. In examples, aspects of the process 300 can be performed by the tire monitors 104 discussed above with reference to FIGS. 1 and 2. However, the process 300 is not limited to being performed by the tire monitors 104, and the tire monitors 104 are not limited to performing the process 300.

At an operation 302, the process 300 includes determining a first operating frequency for a tire monitor to transmit tire data to a first computing device. For example, the first computing device may be the tire pressure monitoring system 116 of the vehicle 100. The tire pressure monitoring system 116 may be configured, e.g., at manufacture and assembly of the vehicle 100, to communicate with original tire monitors via RF signals of a certain frequency. Conventional frequencies for transmitting tire data from a tire monitor to a tire pressure monitoring system can include frequencies of 315 MHz or 433.92 MHz, for example.

At an operation 304, the process 300 includes determining a second operating frequency for a tire monitor to transmit tire data to a second computing device. For example, the second computing device may be the remote computing device 118. For example, the remote computing device 118 can be associated with an owner of the vehicle, a technician, or the like. The second operating frequency may be a frequency at which the second computing device can receive output signals, e.g., RF signals, from the tire pressure monitoring system 116.

At an operation 306, the process 300 includes determining a first protocol for communicating with the first computing device. For example, the first computing device may be the tire pressure monitoring system 116. The tire pressure monitoring system 116 may be configured, e.g., at manufacture and assembly of the vehicle 100, to communicate with the original tire monitors according to a certain protocol. Without limitation, the protocol can specify the types of data to send, the format of the data to send, a channel on which data is to be sent, a power of a signal to be transmitted from the tire monitor 104 to the tire pressure monitoring system 116, and/or any other information associated with signals for carrying information from the tire monitor 104.

At an operation 308, the process 300 includes determining a second protocol for communicating with the second computing device. For example, the second computing device may any remote computing system. The second computing device may be configured to receive data according to any of a number of different protocols, and the operation 308 can include identifying such protocols for the remote computing system. The tire pressure monitoring system 116 may be configured, e.g., at manufacture and assembly of the vehicle 100, to communicate with the original tire monitors according to a certain protocol. Without limitation, the protocol can specify the types of data to send, the format of the data to send, a channel on which data is to be sent, a transmission scheme to use a power of a signal to be transmitted from the tire monitor 104 to the tire pressure monitoring system 116, and/or any other information associated with signals for carrying information from the tire monitor 104. Examples of protocols for transmitting to the second computing device can include Bluetooth® protocols, near field transmission protocols, cellular transmission protocols, e.g., 4G, 4GLTE, 5G, or other RF transmission protocols.

At an operation 310, the process 300 includes configuring a first control module to communicate with the first computing device, via a first antenna, at the first frequency and according to the first protocol. For example, the first control module 204 can switch an input to the first PLL 206 to output the (first) operating frequency carrier signal, as well as switch the first multi-frequency matching circuit 208 to provide an impedance that provides that the power output is substantially the same between different selected frequencies.

At an operation 312, the process 300 includes configuring a second control module to communicate with the second computing device, via a second antenna, at the second frequency and according to the second protocol. For example, the second control module 212 can switch an input to the second PLL 214 to output the (second) operating frequency carrier signal, as well as switch the multi-frequency matching circuit 216 to provide an impedance that provides that the power output is substantially the same between different selected frequencies.

At an operation 314, the process 300 includes generating and transmitting first output signals to the first computing device and generating and transmitting second output signals to the second computing device. As will be appreciated, with the tire monitor 104 configured according to the process 300, tire information such as pressure information, temperature information, acceleration information, position information, or the like, may be transmitted to multiple devices according to different protocols and at multiple frequencies, via multiple antennas. In examples, the tire monitor 104 can be configured to generate and transmit output signals based on characteristics of the devices to which the signals are to be transmitted. Moreover, the operation 314 can include transmitting the first output signals and the second output signals in parallel and/or simultaneously.

In some examples, the tire monitors 104 may be programmed, e.g., according to the process 300, using a programming module. For example, the tire monitors 104 discussed above are capable of operating at one of two or more selectable frequencies, and are able to be programmed to modulate and transmit desired information according to two or more communications protocols. According to some embodiments, the tire monitors 104 and the programming module are wirelessly connected, and the tire monitors 104 may be programmed and configured wirelessly. In other embodiments, the tire monitors 104 and the programming module may be coupled with a wired connection or through a docking type connection. For example, the programming module may include a dock having one or more contacts or connectors that may couple with contacts on the tire monitor 104 to provide configuration and programming for the tire monitor 104. In examples where a wireless connection is utilized, the wireless connection may be implemented through some of the same RF components that are used during operation of the tire monitors 104, or through another wireless interface such as an inductively coupled wireless interface that may be incorporated into the tire monitor 104. In examples where the wireless connection is implemented through the same RF components that are used during operations of the tire monitors 104, the tire monitors 104 may be manufactured and assembled such that the various control modules are configured to operate according to one of multiple selectable frequencies, which may be used for programming and configuration, including to reconfigure the tire monitors 104 to operate according to a different frequency than the initial frequency.

Aspects of this disclosure may reduce a number of replacement parts that a retailer needs to stock. For instance, because the tire monitor 104 can be configured to generate and transmit output signals to many different devices and according to many different protocols and frequencies, the retailer many need only stock the tire monitor 104 described herein.

As apparent from the foregoing, aspects of this disclosure also provide improved detection of unsafe driving conditions associated with tire pressure anomalies. For example, aspects of this disclosure can provide tire information not only to a user interface in the vehicle, as in conventional systems, but also to a remote computing device associated with a vehicle owner, a technician, a passenger, or other person associated with a vehicle of tire pressure anomalies or other tire-related issues.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A tire monitor comprising:
   a pressure sensor configured to output a pressure signal associated with a pressure of a tire;
   a first control module communicatively coupled to the pressure sensor and having a first phase-locked loop (PLL) circuit, the first control module configured to modulate information related to the pressure signal onto a first output signal having a first radio frequency;
   a second control module communicatively coupled to the pressure sensor and having a second PLL circuit, the second control module separate from the first control module and configured to modulate the information related to the pressure signal onto a second output signal having a second radio frequency different from the first radio frequency;
a first antenna to exclusively transmit first signals from the first control module, the first signals including the first output signal at the first radio frequency; and
a second antenna to exclusively transmit second signals from_the second control module, the second signals including the second output signal at the second radio frequency.

2. The tire monitor of claim 1, wherein the first control module and the second control module are configured to transmit the first output signal and the second output signal in parallel.

3. The tire monitor of claim 1, wherein the first control module and the second control module are configured to transmit the first output signal and the second output signal substantially simultaneously.

4. The tire monitor of claim 1, further comprising:
a first RF matching circuit coupled to the first control module and to the first antenna; and
a second RF matching circuit coupled to the second control module and to the second antenna.

5. The tire monitor of claim 4, wherein:
the first RF matching circuit has an impedance that is selectable from at least a first impedance and a second impedance based on the first radio frequency of the first output signal; and
the second RF matching circuit has an impedance that is selectable from at least a third impedance and a fourth impedance based on the second radio frequency of the second output signal.

6. The tire monitor of claim 1, wherein:
the first control module is programmable to selectively output signals at the first radio frequency or at a third radio frequency; and
the second control module is programmable to selectively output signals at the second radio frequency or at a fourth radio frequency.

7. The tire monitor of claim 1, wherein the first radio frequency corresponds to a frequency associated with a tire pressure monitoring system configured to receive the first output signal.

8. The tire monitor of claim 1, wherein the second radio frequency corresponds to a frequency associated with a remote computing device comprising at least one of a mobile device, a tablet, or a personal computing device.

9. A method for configuring a tire monitor to transmit tire data to a plurality of computing devices, the method comprising:
determining a first frequency at which the tire monitor is to transmit the tire data to a first computing device;
determining a second frequency at which the tire monitor is to transmit the tire data to a second computing device;
configuring a first control module to output first output signals associated with the tire data at the first frequency;
configuring a second control module to output second output signals associated with the tire data at the second frequency, the second control module separate from the first control module;
exclusively transmitting the first output signals via a first antenna, the first antenna coupled the first control module; and
exclusively transmitting the second output signals via a second antenna, the second antenna coupled the second control module.

10. The method of claim 9, wherein the transmitting the first output signals and the transmitting the second output signals comprises transmitting the first output signals and the second output signals in parallel.

11. The method of claim 9, wherein the transmitting the first output signals and the transmitting the second output signals in parallel comprises transmitting the first output signals and the second output signals substantially simultaneously.

12. The method of claim 9, further comprising:
determining a first protocol associated with transmitting tire data to the first computing device; and
determining a second protocol associated with transmitting the tire data to the second computing device.

13. The method of claim 12, further comprising:
configuring the first control module to communicate the tire data according to the first protocol; and
configuring the second control module to communicate the tire data according to the second protocol,
wherein at least one of the first protocol or the second protocol comprises at least one of a type of the tire data to be transmitted, a channel for transmitting the tire data, a format for the tire data, or a transmission power.

14. The method of claim 9, further comprising:
selecting a first RF matching circuit associated with the first frequency; and
selecting a second RF matching circuit associated with the second frequency.

15. The method of claim 14, wherein:
the first RF matching circuit has an impedance that is selectable from at least a first impedance and a second impedance based on the first frequency of the first output signal; and
the second RF matching circuit has an impedance that is selectable from at least a third impedance and a fourth impedance based on the second frequency of the second output signal.

16. A system comprising:
a vehicle;
a plurality of tires associated with the vehicle;
a first computing system disposed on the vehicle;
a second computing system remote from the vehicle; and
a tire monitor comprising:
a pressure sensor configured to output a pressure signal associated with a pressure of a tire;
a first control module communicatively coupled to the pressure sensor and having a first phase-locked loop (PLL) circuit, the first control module configured to modulate information related to the pressure signal onto a first output signal having a first radio frequency associated with the first computing system;
a second control module communicatively coupled to the pressure sensor and having a second PLL circuit, the second control module configured to modulate the information related to the pressure signal onto a second output signal having a second radio frequency associated with the second computing system, wherein the second radio frequency is different from the first radio frequency;
a first antenna via which the first control module transmits the first output signal at the first radio frequency to the first computing system; and a second antenna via which the second control module transmits the second output signal at the second radio frequency to the second computing system.

17. The system of claim 16, wherein the first control module and the second control module are configured to output the first output signal and the second output signal in parallel.

18. The system of claim 16, wherein the first control module and the second control module are configured to output the first output signal and the second output signal substantially simultaneously.

19. The system of claim 16, wherein the tire monitor further comprises:
- a first RF matching circuit coupled to the first control module and to the first antenna; and
- a second RF matching circuit coupled to the second control module and to the second antenna.

20. The system of claim 19, wherein:
- the first RF matching circuit has an impedance that is selectable from at least a first impedance and a second impedance based on the first radio frequency; and
- the second RF matching circuit has an impedance that is selectable from at least a third impedance and a fourth impedance based on the second radio frequency.

* * * * *